(12) United States Patent
Kim et al.

(10) Patent No.: US 9,288,578 B2
(45) Date of Patent: Mar. 15, 2016

(54) METHOD AND APPARATUS FOR CANCELING ACOUSTIC ECHO, AND METHOD FOR UPDATING ADAPTIVE FILTER COEFFICIENT BY THE APPARATUS

(71) Applicant: ELECTRONICS AND TELECOMMUNICATIONS RESEARCH INSTITUTE, Daejeon (KR)

(72) Inventors: Hyun Woo Kim, Daejeon (KR); Do Young Kim, Daejeon (KR); Woojik Chun, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 178 days.

(21) Appl. No.: 14/061,671

(22) Filed: Oct. 23, 2013

(65) Prior Publication Data

US 2014/0112488 A1    Apr. 24, 2014

(30) Foreign Application Priority Data

Oct. 23, 2012 (KR) ......................... 10-2012-0118124
Oct. 2, 2013 (KR) ......................... 10-2013-0118051

(51) Int. Cl.
*H04R 3/02* (2006.01)
*H04M 9/08* (2006.01)

(52) U.S. Cl.
CPC ................ *H04R 3/02* (2013.01); *H04M 9/082* (2013.01); *H04R 2430/03* (2013.01)

(58) Field of Classification Search
None
See application file for complete search history.

(56) References Cited

U.S. PATENT DOCUMENTS

| 2008/0240415 A1* | 10/2008 | Mohammad et al. .... 379/406.08 |
| 2009/0123002 A1 | 5/2009 | Karthik et al. |
| 2010/0057454 A1 | 3/2010 | Mohammad et al. |

FOREIGN PATENT DOCUMENTS

| KR | 10-2009-0122802 A | 12/2009 |
| KR | 10-2011-0021318 A | 3/2011 |

OTHER PUBLICATIONS

Yin Zhou et al., "A variable step-size for frequency-domain acoustic echo cancellation", 2007 IEEE Workshop on Applications of Signal Processing to Audio and Acoustics, Oct. 21-24, 2007, pp. 303-306, New Paltz, USA.

* cited by examiner

*Primary Examiner* — Wayne Young
*Assistant Examiner* — Mark Fischer

(57) ABSTRACT

An apparatus for canceling an acoustic echo signal caused by a far-end talker signal is provided. The apparatus for canceling an acoustic echo signal includes: a variance estimating unit configured to estimate a variance of a first audio signal of a near-end talker signal and a first noise signal of the near-end talker signal; a step size determining unit configured to determine a step size by using the variance of the first audio signal and the variance of the first noise signal; an adaptive filter coefficient updating unit configured to update an adaptive filter coefficient of an adaptive filter by using the step size; and an acoustic echo canceling unit configured to estimate an acoustic echo signal by using the adaptive filter coefficient, and cancel the acoustic echo signal from a microphone input signal by using the estimated acoustic echo signal.

15 Claims, 6 Drawing Sheets

METHOD AND APPARATUS FOR CANCELING ACOUSTIC ECHO, AND METHOD FOR UPDATING ADAPTIVE FILTER COEFFICIENT BY THE APPARATUS

CROSS-REFERENCE TO RELATED APPLICATION

This application claims priority to and the benefit of Korean Patent Application No. 10-2012-0118124 and 10-2013-0118051 filed in the Korean Intellectual Property Office on Oct. 23, 2012 and Oct. 2, 2013, the entire contents of which are incorporated herein by reference.

BACKGROUND OF THE INVENTION (a) Field of the Invention

The present invention relates to a method and apparatus for canceling an acoustic echo signal.

(b) Description of the Related Art

An acoustic echo canceller (AEC) is a device that re-inputs an audio signal output from a speaker to a microphone directly or indirectly (through reflection from a wall or a peripheral object) in a video call, a video conference, or the like, to thus cancel acoustic echo, which is the repetition of a sound of a user. In canceling acoustic echo with an AEC, it is very important to accurately estimate an acoustic echo generation path (or a room impulse response (RIR)). In general, the AEC estimates the acoustic echo generation path (or RIR) by using an adaptive filter, and generates an estimated acoustic echo signal. Thereafter, the AEC subtracts the estimated acoustic echo signal from an actual acoustic echo signal, thus canceling acoustic echo.

A method of updating an adaptive filter coefficient of an adaptive filter for estimating an acoustic echo generation path (or RIR) includes a method of using a recursive least squares (RLS) algorithm, a method of using a least mean square (LMS) algorithm, a method of using a normalized least mean square (NLMS) algorithm, a method of using an affine projection algorithm, and the like. Each updating method is implemented even in a frequency domain and a sub-band domain, as well as in a time domain. Most AECs use the NLMS algorithm due to a small amount of calculation and ease in implementation. Meanwhile, in a case of updating an adaptive filter coefficient, the NLMS algorithm requires a step size parameter. If a step size is large, an acoustic echo generation path may be more promptly estimated, but a difference between the estimated acoustic echo generation path and an actual acoustic echo generation path is increased. Conversely, if a step size is small, an acoustic echo generation path may be more accurately estimated, but more time is required for estimation. Thus, in order to enhance both a convergence speed as to how fast an estimated acoustic echo generation path is converged on an actual acoustic echo generation path and accuracy of the estimated acoustic echo signal, a step size is required to be variably controlled. Various methods of variably controlling a step size have been proposed.

Recently, Qualcomm has proposed a method of adjusting a step size resistant to double torque by estimating energy of a noise signal and an audio signal of a near-end talker signal in a time domain through U.S. Patent Laid-Open Publication No. 2010/0057454. Meanwhile, Yin Zhou and Xiaodong Li presented a method of controlling a step size in a frequency domain such that increments of errors (adaptive filter mismatch errors) between an adaptive filter coefficient and an actual acoustic echo generation path are minimized, in an article entitled "A variable step-size for frequency-domain acoustic echo cancellation".

However, the foregoing related arts have a problem in that, when an actual acoustic echo generation path is changed over time, an adaptive filter coefficient cannot quickly follow the actual acoustic echo generation path in a frequency domain.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for controlling a step size in a frequency domain.

The present invention has also been made in an effort to provide a step size controlling method by which an adaptive filter coefficient is quickly adaptable to an actual acoustic echo generation path even though the actual acoustic echo generation path is changed over time.

The present invention has also been made in an effort to provide an acoustic echo canceling method and apparatus using a variable step size.

An exemplary embodiment of the present invention provides an apparatus for canceling an acoustic echo signal caused by a far-end talker signal. The apparatus for canceling an acoustic echo signal may include: a variance estimating unit configured to estimate a variance of a first audio signal of a near-end talker signal and a first noise signal of the near-end talker signal; a step size determining unit configured to determine a step size by using the variance of the first audio signal and the variance of the first noise signal; an adaptive filter coefficient updating unit configured to update an adaptive filter coefficient of an adaptive filter by using the step size; and an acoustic echo canceling unit configured to estimate an acoustic echo signal by using the adaptive filter coefficient, and cancel the acoustic echo signal from a microphone input signal by using the estimated acoustic echo signal generated through the estimation of the acoustic echo signal. The step size determining unit may determine the step size such that a first residual signal is equal to the near-end talker signal. The first residual signal may be a signal obtained by subtracting a first estimated acoustic echo signal as the estimated acoustic echo signal from the microphone input signal The first estimated acoustic echo signal may be a signal obtained by using the adaptive filter coefficient updated.

The variance estimating unit may estimate the variance of the first noise signal and the variance of the first audio signal by using the probability of presence of the acoustic echo signal.

The variance estimating unit may estimate the variance of the first noise signal and the variance of the first audio signal by using the probability that a second audio signal will exist in the far-end talker signal.

The variance estimating unit may use a first probability that only a second noise signal will exist in the far-end talker signal in a frequency domain and a second probability that the second audio signal and the second noise signal will exist in the far-end talker signal in the frequency domain.

The variance estimating unit may estimate a first sum as the sum of the variance of the first noise signal and the variance of the first audio signal through smoothing.

The variance estimating unit may calculate the first sum by using a variance of the acoustic echo signal.

The second audio signal and the second noise signal may be statistically independent from one another.

The step size determining unit may determine the step size by using the sum of the variance of the first audio signal and the variance of the first noise signal.

The adaptive filter coefficient updating unit may use a normalized least mean square (NLMS) algorithm in a frequency domain.

Another embodiment of the present invention provides a method of canceling an acoustic echo signal caused by a far-end talker signal by an acoustic echo canceller. The method of canceling acoustic echo may include: estimating a variance of a first audio signal of a near-end talker signal and a first noise signal of the near-end talker signal; determining a step size by using the variance of the first audio signal and the variance of the first noise signal; updating an adaptive filter coefficient of an adaptive filter by using the step size; generating an estimated acoustic echo signal corresponding to the acoustic echo signal by using the adaptive filter coefficient; and canceling the acoustic echo signal from a microphone input signal by using the estimated acoustic echo signal. In the determining, the step size is determined such that a first residual signal is equal to the near-end talker signal. The first residual signal is a signal obtained by subtracting a first estimated acoustic echo signal as the estimated acoustic echo signal from the microphone input signal. When a path (a room impulse response (RIR)) for generating the first acoustic echo signal is modeled by a filter, and the adaptive filter coefficient may correspond to a filter coefficient of the filter.

Yet another embodiment of the present invention provides a method of updating an adaptive filter coefficient by an acoustic echo canceller including an adaptive filter. The method for updating an adaptive filter coefficient may include:

estimating a first variance sum as the sum of a variance of an audio signal of a near-end talker signal and a variance of a noise signal of the near-end talker signal;

determining a step size by using the first variance sum; and updating the adaptive filter coefficient by using the step size.

DETAILED DESCRIPTION OF THE EMBODIMENTS

Figure 1:
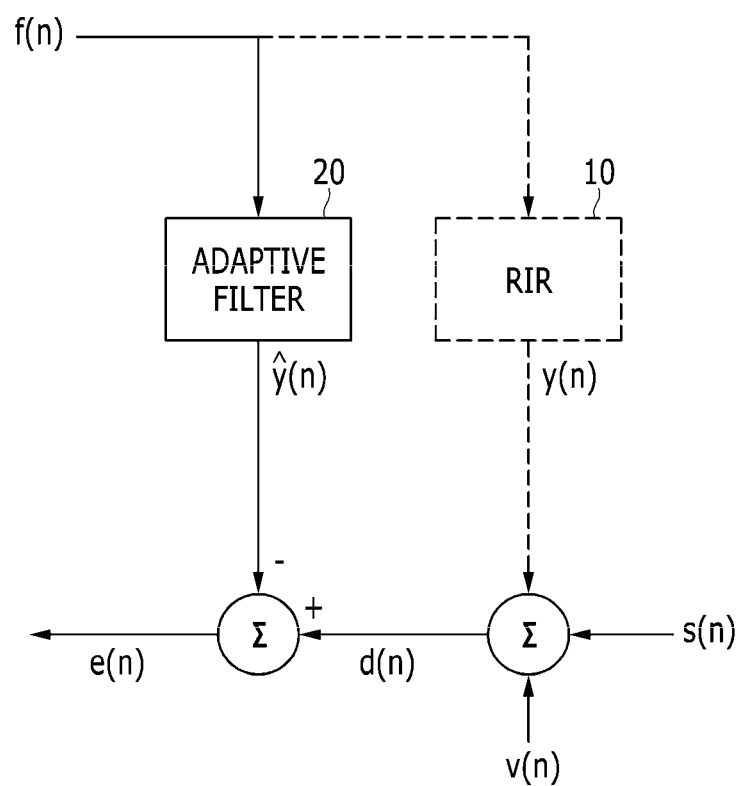
FIG. 1 is a view illustrating a process of canceling acoustic echo by a general acoustic echo canceller in a time domain.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a view illustrating a process of canceling acoustic echo by a general acoustic echo canceller in a time domain.

An audio signal (s(n)) of a near-end talker signal and a noise signal (v(n)) of the near-end talker signal at a time n are input to a microphone.

Meanwhile, a far-end talker signal (f(n)) output from a speaker at a time n is input to a filter 10. Here, the filter 10 is a virtual filter which has modeled an actual acoustic echo generation path (or RIR), and it is assumed that the filter 10 has a filter coefficient ($\vec{w}(n)$). An actual acoustic echo signal (y(n)) at the time is generated by the filter 10, is input to the microphone. As a result, microphone input signals input to the near-end talker microphone at the time n are s(n)+v(n)+y(n).

An adaptive filter 20 estimates the actual acoustic echo signal (y(n)) by using the far-end talker signal (f(n)) to generate an estimated acoustic echo signal (ŷ(n)). Here, the adaptive filter 20, which corresponds with the filter 10, has an adaptive filter coefficient ($\hat{\vec{w}}(n)$).

When the estimated acoustic echo signal (ŷ(n)) is subtracted from the microphone input signal (d(n)), a residual signal (e(n)) is generated. As a result, the residual signal is a signal without acoustic echo.

Figure 2:
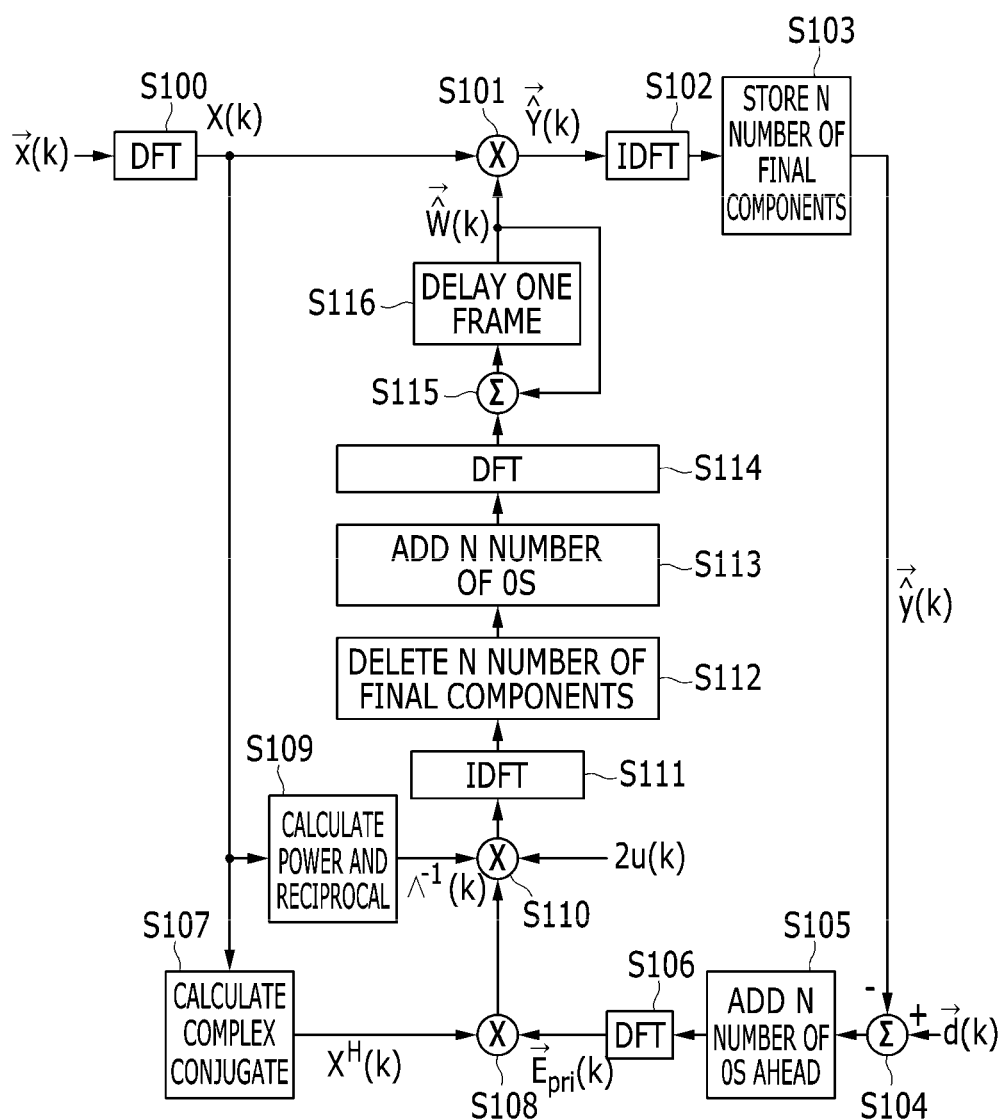
FIG. 2 is a view illustrating a process of canceling acoustic echo by the general acoustic echo canceller in a frequency domain.

FIG. 2 is a view illustrating a process of canceling acoustic echo by the general acoustic echo canceller in a frequency domain. In FIG. 2, a case in which acoustic echo is canceled by using an overlap-save method is shown.

A far-end talker signal vector ($\vec{x}(k)$) of a kth frame and a microphone input signal vector ($\vec{d}(k)$) are defined as represented by Equation 1 below.

$$\vec{x}(k)=[f(kN-N), \ldots ,f(kN-1),f(kN), \ldots ,f(kN+N-1)]^T$$

$$\vec{d}(k)=[d(kN), \ldots ,d(kN+N-1)]^T \quad \text{[Equation 1]}$$

Here, N is a natural number representing a frame size, and $[\ ]^T$ is a transposed matrix.

When the far-end talker signal vector ($\vec{x}(k)$) is converted into a frequency domain (S100), a far-end talker signal matrix (X(k)) in the frequency domain may be represented by Equation 2 below.

$$X(k)=\text{diag}\{F\vec{x}(k)\} \quad \text{[Equation 2]}$$

In Equation 2, F is a 2N×2N discrete Fourier transform (DFT) matrix, and diag{·} is an operator generating a diagonal matrix.

An adaptive filter coefficient vector ($\hat{\vec{w}}(k)$) of the kth frame is defined as represented by Equation 3 below. Here, the adaptive filter coefficient vector ($\hat{\vec{w}}(k)$) represents an acoustic echo path estimated in the time domain.

$$\hat{\vec{w}}(k)=[\hat{w}_0(k), \ldots ,\hat{w}_{N-1}(k)]^T \quad \text{[Equation 3]}$$

When number of 0s are added behind the adaptive filter coefficient vector ($\hat{\vec{w}}(k)$) and converted into the frequency domain, an adaptive filter coefficient vector ($\hat{\vec{W}}(k)$) in the frequency domain may be represented by Equation 4 below.

$$\hat{\vec{W}}(k)=FL^T\hat{\vec{w}}(k) \quad \text{[Equation 4]}$$

Here, L is $[I_N O_N]$, $O_N$ is an N×N matrix in which all the values are 0, and $I_N$ is an N×N identity matrix.

An acoustic echo signal vector ($\hat{\vec{Y}}(k)$) is generated by multiplying the far-end talker signal matrix (X(k)) by the adaptive filter coefficient vector ($\hat{\vec{W}}(k)$) (S101). That is, the estimated acoustic echo signal vector ($\hat{\vec{Y}}(k)$) is represented by Equation 5 below.

$$\hat{\vec{Y}}(k)=X(k)\hat{\vec{W}}(k) \qquad \text{[Equation 5]}$$

The acoustic echo signal vector ($\hat{\vec{y}}(k)$) estimated in the time domain is obtained by performing IDFT (inverse discrete Fourier transform) on the estimated acoustic echo signal vector ($\hat{\vec{Y}}(k)$) (S102) and subsequently selecting only N number of final components (S103). That is, the estimated acoustic echo signal vector ($\hat{\vec{y}}(k)$) is represented by Equation 6 below.

$$\hat{\vec{y}}(k)=RF^{-1}\hat{\vec{Y}}(k) \qquad \text{[Equation 6]}$$

Here, R is $[O_N I_N]$.

The residual signal vector ($\vec{E}_{pri}(k)$) is obtained by obtaining a difference between the microphone input signal vector ($\vec{d}(k)$) and the estimated acoustic echo signal vector ($\hat{\vec{y}}(k)$) (S104), adding the number of 0s (S105), and converting the same into a frequency domain (S106). That is, the residual signal vector ($\vec{E}_{pri}(k)$) may be represented by Equation 7 below.

$$\vec{E}_{pri}(k)=FR^T(\vec{d}(k)-\hat{\vec{y}}(k)) \qquad \text{[Equation 7]}$$

When a step size in an m-th frequency bin is defined as $\mu_m(k)$ and power of the m-th frequency bin is defined as $P_m(k)$, a normalized step size matrix (u(k)) and power matrix $\Lambda(k)$ of the far-end talker signal are represented by Equation 8 below.

$$u(k)=\text{diag}\{\mu_0(k),\ldots,\mu_{2N-1}(k)\}$$

$$\Lambda(k)=\text{diag}\{P_0(k),\ldots,P_{2N-1}(k)\} \qquad \text{[Equation 8]}$$

The adaptive filter coefficient vector ($\hat{\vec{W}}(k)$) is updated through operations S107 to S116. That is, the adaptive filter coefficient vector ($\hat{\vec{W}}(k)$) is updated as shown in Equation 9 below.

$$\hat{\vec{W}}(k+1)=\hat{\vec{W}}(k)+2Gu(k)\Lambda^{-1}(k)X^H(k)\vec{E}_{pri}(k) \qquad \text{[Equation 9]}$$

Here, G is $FgF^{-1}$, and g is $$\begin{bmatrix} I_N O_N \\ O_N O_N \end{bmatrix}.$$

$\hat{\vec{W}}(k+1)$ represents an updated adaptive filter coefficient vector. $\Lambda^{-1}(k)$ is obtained through a power calculation and reciprocal calculation operation (S109). $X^H(k)$ is obtained through a complex conjugate calculation operation (S107). $X^H(k)$ During the operations S111 to S114, the signal obtained through the operation S110 is converted into frequency domain→time domain→frequency domain.

Figure 3:
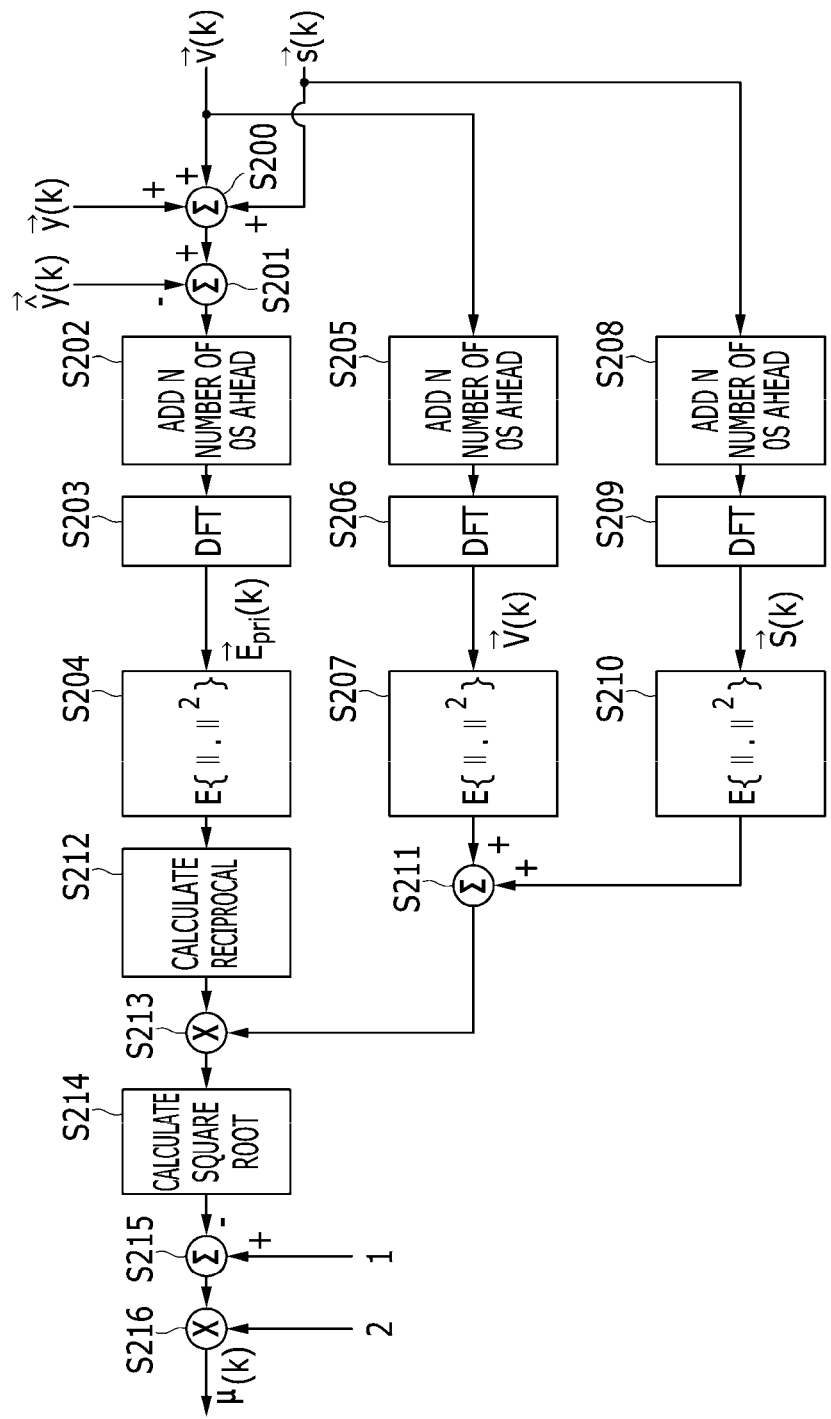
FIG. 3 is a view illustrating a process of determining a step size according to an embodiment of the present invention.

FIG. 3 is a view illustrating a process of determining a step size according to an embodiment of the present invention. A step size (u(k)) is used to regulate updating of the adaptive filter coefficient vector ($\hat{\vec{W}}(k)$) in the frequency domain.

The microphone input signal vector ($\vec{d}(k)$) in the time domain includes a noise signal vector ($\vec{v}(k)$) of the near-end talker signal, an audio signal vector ($\vec{s}(k)$) of the near-end talker signal, and an acoustic echo signal vector ($\vec{y}(k)$). Here, the noise signal vector ($\vec{v}(k)$) and the audio signal vector ($\vec{s}(k)$) are statistically independent from one another. The noise signal vector ($\vec{V}(k)$) of the near-end talker signal and the audio signal vector ($\vec{S}(k)$) of the near-end talker signal in the frequency domain are represented by Equation 10 below. Equation 10 corresponds to operations S205, S206, S208, and S209.

$$\vec{V}(k)=[V_0(k),\ldots,V_{N-1}(k)]^T=FR^T\vec{v}(k)$$

$$\vec{S}(k)=[S_0(k),\ldots,S_{N-1}(k)]^T=FR^T\vec{s}(k) \qquad \text{[Equation 10]}$$

A pre-residual signal vector ($\vec{E}_{pri}(k)$) obtained by using the adaptive filter coefficient vector ($\hat{\vec{W}}(k)$) is obtained through operations S200 to S230. That is, the pre-residual signal vector ($\vec{E}_{pri}(k)$) is represented by Equation 11 below.

$$\begin{aligned}\vec{E}_{pri}(k) &= [E_{pri,0}(k),\ldots,E_{pri,N-1}(k)]^T \\ &= FR^T(\vec{d}(k)-\hat{\vec{y}}(k)) \\ &= FR^T RF^{-1}(\vec{Y}(k)-\hat{\vec{Y}}(k))+\vec{V}(k)+\vec{S}(k) \\ \vec{E}_{pri}(k) &= \tilde{G}X(k)(\vec{W}(k)-\hat{\vec{W}}(k))+\vec{V}(k)+\vec{S}(k)\end{aligned} \qquad \text{[Equation 11]}$$

Here, $\tilde{G}$ is $F\tilde{g}F^{-1}$, and $\tilde{g}$ is $$R^T R = \begin{bmatrix} O_N O_N \\ O_N I_N \end{bmatrix}.$$

$\vec{W}(k)$ is obtained by converting the filter coefficient ($\vec{w}(n)$) of the filter 10 in the time domain into a frequency domain.

Meanwhile, a post-residual signal vector ($\vec{E}_{post}(k)$) obtained by using an updated adaptive filter coefficient vector ($\hat{\vec{W}}(k+1)$) is represented by Equation 12 below.

$$\vec{E}_{post}(k)=\tilde{G}X(k)(\vec{W}(k)-\hat{\vec{W}}(k+1))+\vec{V}(k)+\vec{S}(k) \qquad \text{[Equation 12]}$$

A difference between the pre-residual signal vector ($\vec{E}_{pri}(k)$) and the post-residual signal vector ($\vec{E}_{post}(k)$) is obtained as expressed by Equation 13 below.

$$\vec{E}_{post}(k)=\vec{E}_{pri}(k)+\tilde{G}X(k)(\hat{\vec{W}}(k)-\hat{\vec{W}}(k+1)) \qquad \text{[Equation 13]}$$

A step size (u(k)) is determined such that the post-residual signal vector is equal to $\vec{V}(k)+\vec{S}(k)$. When Equation 9 is applied to Equation 13 and solved, Equation 14 may be obtained.

$$\vec{V}(k)+\vec{S}(k)=\vec{E}_{pri}(k)-2\tilde{G}X(k)Gu(k)\Lambda^{-1}(k)X^H(k)\vec{E}_{pri}(k) \qquad \text{[Equation 14]}$$

When it is assumed that different frequency bins are independent from each other, a step size ($\mu_m(k)$) may be independently determined in each m-th frequency bin from Equation 15 below.

$$V_m(k)+S_m(k)=E_{pri,m}(k)-2\vec{j}_m\tilde{G}X(k)Gu(k)\Lambda^{-1}(k)X^H(k)\vec{E}_{pri}(k) \qquad \text{[Equation 15]}$$

Here, $\vec{j}_m$ is a 1×2N vector in which only the m-th element value is 1 and the remaining element values are 0.

When both sides of Equation 15 are squared and averaged, Equation 16 below is obtained.

$$E\{|V_m(k)|^2\} + E\{|S_m(k)|^2\} = E\{|E_{pri,m}(k)|^2\} - \quad \text{[Equation 16]}$$
$$4E\{\text{Re}[E^*_{pri,m}(k)\vec{j}_m \tilde{G}X(k)Gu(k)\Lambda^{-1}(k)X^H(k)\vec{E}_{pri}(k)]\} +$$
$$4E\{\vec{E}^H_{pri}(k)X(k)\Lambda^{-1}(k)u^H(k)G^H X^H(k)\tilde{G}^H$$
$$\vec{j}^H_m \vec{j}_m \tilde{G}X(k)Gu(k)\Lambda^{-1}(k)X^H(k)\vec{E}_{pri}(k)\}$$

Here, Re[ ] is a real part of a complex number, and $E^*_{pri,m}(k)$ is a complex conjugate of $E_{pri,m}(k)$. When Equation 16 is approximated with $G \approx I_{2N}/2$, $\tilde{G} \approx I_{2N}/2$, Equation 17 below is obtained.

$$E\{|V_m(k)|^2\} + E\{|S_m(k)|^2\} = \quad \text{[Equation 17]}$$
$$E\{|E_{pri,m}(k)|^2\} + \frac{1}{4}\mu_m^2(k)E\left\{\frac{|X_{m,m}(k)|^4|E_{pri,m}(k)|^2}{P_m^2(k)}\right\} -$$
$$\mu_m(k)E\left\{\frac{|X_{m,m}(k)|^2|E_{pri,m}(k)|^2}{P_m(k)}\right\} \approx E\{|E_{pri,m}(k)|^2\} +$$
$$\frac{1}{4}\mu_m^2(k)E\{|E_{pri,m}(k)|^2\} - \mu_m(k)E\{|E_{pri,m}(k)|^2\}$$

Here, $X_{m,m}(k)$ is a value present in an m-th row and an m-th column of the far-end talker signal matrix ($X(k)$). When a quadratic equation with respect to a step size ($\mu_m(k)$) is solved, Equation 18 is obtained.

$$\mu_m(k) = 2\left(1 - \sqrt{\frac{E\{|V_m(k)|^2\} + E\{|S_m(k)|^2\}}{E\{|E_{pri,m}(k)|^2\}}}\right), \quad \text{[Equation 18]}$$
$$m = 0, \ldots, N-1$$

That is, the step size ($\mu_m(k)$) is determined by using a variance ($E\{|V_m(k)|^2\}$) of the noise signal of the near-end talker signal, a variance ($E\{|S_m(k)|^2\}$) of the audio signal of the near-end talker signal, and a variance ($E\{|E_{pri,m}(k)|^2\}$) of the residual signal. Equation 18 corresponds to operations S204, S207, and S210 to S216.

Figure 4:
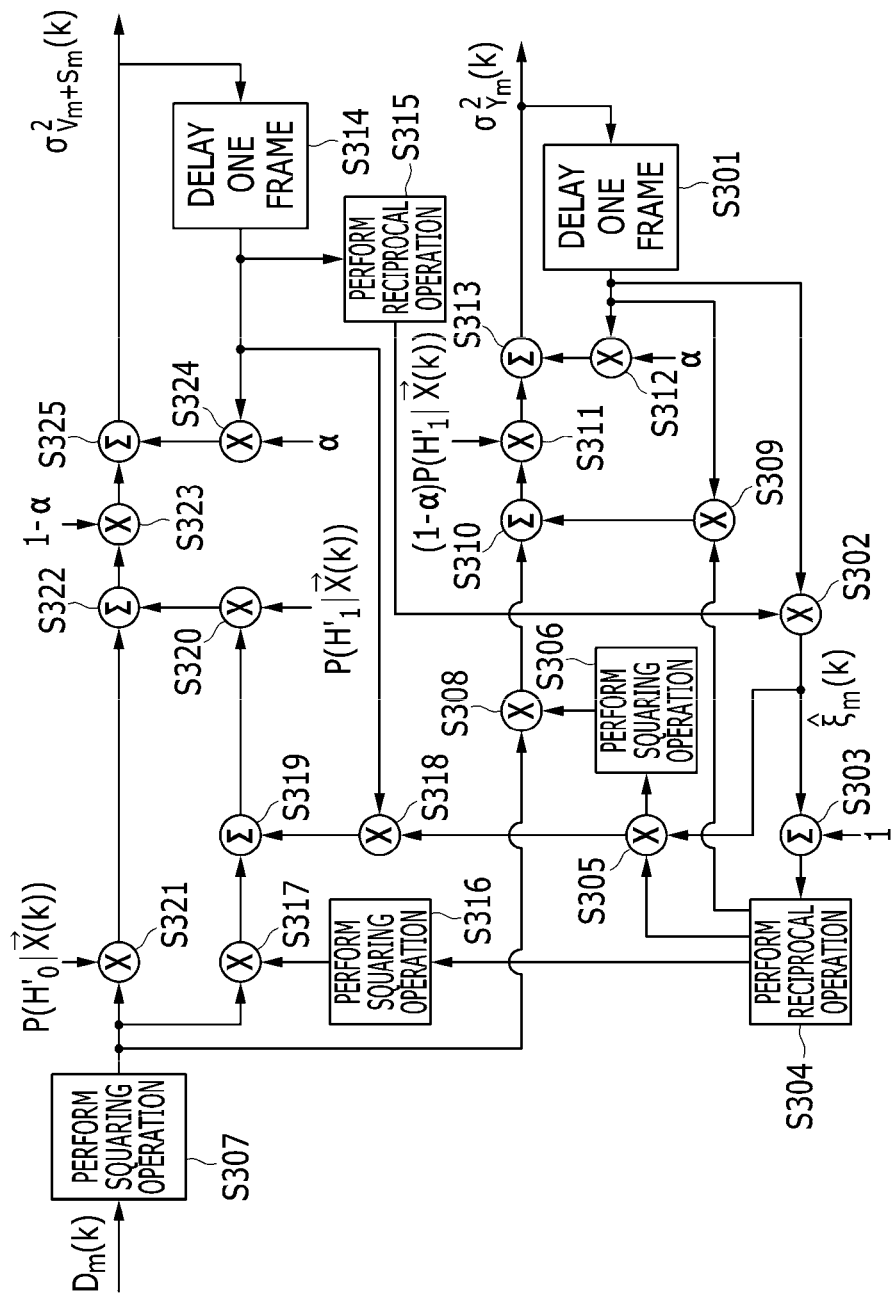
FIG. 4 is a view illustrating a process of estimating variances of an audio signal and a noise signal of a near-end talker signal according to an embodiment of the present invention.

FIG. 4 is a view illustrating a process of estimating variances of an audio signal and a noise signal of a near-end talker signal according to an embodiment of the present invention. As described above, the variance ($E\{|E_{pri,m}(k)|^2\}$) of the residual signal, the variance ($E\{|V_m(k)|^2\}$) of the noise signal of the near-end talker signal, and the variance ($E\{|S_m(k)|^2\}$) of the audio signal of the near-end talker signal are required to obtain the step size ($\mu_m(k)$). In an embodiment of the present invention, variances of the audio signal and the noise signal of the near-end talker signal can be estimated on the basis of a statistical model in the frequency domain resistant to noise change over time.

A square of the residual signal ($E\{|E_{pri,m}(k)|^2\}$) may be directly measured. Thus, the variance ($E\{|E_{pri,m}(k)|^2\}$) of the residual signal required for obtaining the step size ($\mu_m(k)$) may be estimated by performing a smoothing operation with a factor ($\beta$) having a value $0\beta<1$ as expressed in Equation 19 below.

$$E\{|E_{pri,m}(k+1)|^2\} = \beta E\{|E_{pri,m}(k)|^2\} + (1-\beta)|E_{pri,m}(k)|^2 \quad \text{[Equation 19]}$$

Meanwhile, unlike the variance ($E\{|E_{pri,m}(k)|^2\}$) of the residual signal, it is difficult to directly calculate the variance ($E\{|V_m(k)|^2\}$) of the noise signal of the near-end talker signal and the variance ($E\{|S_m(k)|^2\}$) of the audio signal of the near-end talker signal. In an embodiment of the present invention, the probability of presence of acoustic echo is calculated on the basis of a statistical model to estimate the variance ($E\{|V_m(k)|^2\}$) of the noise signal of the near-end talker signal and the variance ($E\{|S_m(k)|^2\}$) of the audio signal of the near-end talker signal. Hypotheses may be formulated for a case ($H_0$) in which the acoustic echo signal vector ($\vec{Y}(k)$) does not exist in the microphone input signal vector ($\vec{D}(k) = [D_0(k), \ldots, D_{N-1}(k)]^T$) and a case ($H_1$) in which it exists, in the frequency domain, as represented by Equation 20 below.

$$H_0: \vec{D}(k) = \vec{V}(k) + \vec{S}(k)$$
$$H_1: \vec{D}(k) = \vec{V}(k) + \vec{S}(k) + \vec{Y}(k) \quad \text{[Equation 20]}$$

It is assumed that respective frequency bins are statistically independent from one another. Also, when it is assumed that the noise signal vector ($\vec{V}(k)$) of the near-end talker signal, the audio signal vector ($\vec{S}(k)$), and the acoustic echo signal vector ($\vec{Y}(k)$) are statistically independent from one another and a normal distribution has an average of 0, a probability distribution may be expressed by Equation 21 below.

$$P(D_m(k)|H_0) = \frac{1}{\pi(\sigma^2_{V_m+S_m}(k))}\exp\left[-\frac{|D_m(k)|^2}{\sigma^2_{V_m+S_m}(k)}\right] \quad \text{[Equation 21]}$$
$$P(D_m(k)|H_1) =$$
$$\frac{1}{\pi(\sigma^2_{V_m+S_m}(k) + \sigma^2_{Y_m}(k))}\exp\left[-\frac{|D_m(k)|^2}{\sigma^2_{V_m+S_m}(k) + \sigma^2_{Y_m}(k)}\right]$$

Here, exp[ ] indicates an exponential function. However, since the near-end talker signal and the acoustic echo signal correspond to a voice, the two hypotheses ($H_0$, $H_1$) have similar probability distributions. Thus, it is difficult to discriminate between the two hypotheses ($H_0$, $H_1$) and obtain the probability of presence of an acoustic echo signal by using the probability distributions of Equation 21. That is, in order to discriminate between the two hypotheses ($H_0$, $H_1$) by using the probability distributions, the probability distributions should be significant, but audio signals of the acoustic echo signal and the near-end talker signal are not sufficiently significant to be easily discriminated.

In an embodiment of the present invention, instead of a probability that the acoustic echo signal vector ($\vec{Y}(k)$) will exist in the microphone input signal vector ($\vec{D}(k)$), a probability that an audio signal vector ($\vec{B}(k)$) will exist in the far-end talker signal vector ($\vec{X}(k) = [X_0(k), \ldots, X_{N-1}(k)]^T$) is used. Hypotheses may be formulated for a case) ($H'_0$) in which the audio signal vector ($\vec{B}(k)$) does not exist in the far-end talker signal vector ($\vec{X}(k)$) and a case ($H'_1$) in which it exists, in the frequency domain, as represented by Equation 22 below.

$$H'_0: \vec{X}(k) = \vec{N}(k)$$
$$H'_1: \vec{X}(k) = \vec{N}(k) + \vec{B}(k) \quad \text{[Equation 22]}$$

Here, $\vec{N}(k)$ is a noise signal vector of the far-end talker signal, and $\vec{B}(k)$ is an audio signal vector of the far-end talker signal.

Probability distributions of the two hypotheses ($H'_0$, $H'_1$) are expressed by Equation 23 below.

$$P(X_m(k) \mid H'_0) = \frac{1}{\pi \sigma^2_{N_m}(k)} \exp\left[-\frac{|X_m(k)|^2}{\sigma^2_{N_m}(k)}\right] \quad \text{[Equation 23]}$$

$$P(X_m(k) \mid H'_1) = \frac{1}{\pi(\sigma^2_{N_m}(k) + \sigma^2_{B_m}(k))} \exp\left[-\frac{|X_m(k)|^2}{\sigma^2_{N_m}(k) + \sigma^2_{B_m}(k)}\right]$$

When it is assumed that the noise signal vector ($\vec{N}(k)$) and the audio signal vector ($\vec{B}(k)$) of the far-end talker signal are statistically independent from one another and a normal distribution has an average of 0, the probability that the acoustic echo signal vector ($\vec{Y}(k)$) will exist in the microphone input signal vector ($\vec{D}(k)$) may be obtained as expressed by Equation 24 below.

$$P(H_1 \mid \vec{D}(k)) = \quad \text{[Equation 24]}$$

$$P(H'_1 \mid \vec{X}(k)) = \frac{1}{1 + \frac{p(H'_1)}{p(H'_0)} \prod_{m=1}^{N} \frac{P(X_m(k) \mid H'_1)}{P(X_m(k) \mid H'_0)}}$$

$$P(H_0 \mid \vec{D}(k)) = 1 - P(H_1 \mid \vec{D}(k))$$

Here, $$\prod_{m=1}^{N} \frac{P(X_m(k) \mid H'_1)}{P(X_m(k) \mid H'_0)} \text{ is } \frac{P(X_1(k) \mid H'_1)}{P(X_1(k) \mid H'_0)} \times \frac{P(X_2(k) \mid H'_1)}{P(X_2(k) \mid H'_0)} \times \ldots \times \frac{P(X_N(k) \mid H'_1)}{P(X_N(k) \mid H'_0)}.$$

The sum ($\sigma^2_{V_m+S_m}(k)$) of variances of the noise signal and the audio signal of the near-end talker signal required for obtaining the step size ($\mu_m(k)$) may be estimated by performing a smoothing operation with a factor ($\alpha$) having a value $0 < \alpha < 1$ as expressed by Equation 25 below.

$$\sigma^2_{V_m+S_m}(k+1) = \alpha \sigma^2_{V_m+S_m}(k) + (1-\alpha) E\{(|V_m(k)|^2 + |S_m(k)|^2) \mid D_m(k)\}$$

$$\sigma^2_{Y_m}(k+1) = \alpha \sigma^2_{Y_m}(k) + (1-\alpha) E\{(|Y_m(k)|^2) \mid D_m(k)\} \quad \text{[Equation 25]}$$

Here, $E\{(|V_m(k)|^2 + |S_m(k)|^2) \mid D_m(k)\}$ is expressed by Equation 26 below. Here, $E\{(|Y_m(k)|^2) \mid D_m(k)\}$ is expressed by Equation 27 below.

$$E\{(|V_m(k)|^2 + |S_m(k)|^2) \mid D_m(k)\} = \quad \text{[Equation 26]}$$
$$E\{(|V_m(k)|^2 + |S_m(k)|^2) \mid D_m(k), H_0\} P(H'_0 \mid \vec{X}(k)) +$$
$$E\{(|V_m(k)|^2 + |S_m(k)|^2) \mid D_m(k), H_1\} P(H'_1 \mid \vec{X}(k))$$

$$E\{(|Y_m(k)|^2) \mid D_m(k)\} = \quad \text{[Equation 27]}$$
$$E\{(|Y_m(k)|^2) \mid D_m(k), H_0\} P(H'_0 \mid X(k)) +$$
$$E\{(|Y_m(k)|^2) \mid D_m(k), H_1\} P(H'_1 \mid \vec{X}(k))$$

$E\{(|V_m(k)|^2 + |S_m(k)|^2) \mid D_m(k), H_0\}$ and $E\{(|V_m(k)|^2 + |S_m(k)|^2) \mid D_m(k), H_1\}$ in Equation 26 are expressed by Equation 28 below.

$$E\{(|V_m(k)|^2 + |S_m(k)|^2) \mid D_m(k), H_0\} = |D_m(k)|^2 \quad \text{[Equation 28]}$$

$$E\{(|V_m(k)|^2 + |S_m(k)|^2) \mid D_m(k), H_1\} =$$
$$\left(\frac{\hat{\xi}_m(k)}{1+\hat{\xi}_m(k)}\right) \sigma^2_{V_m+S_m}(k) + \left(\frac{1}{1+\hat{\xi}_m(k)}\right)^2 (|D_m(k)|^2)$$

Also, $E\{(|Y_m(k)|^2) \mid D_m(k), H_0\}$ and $E\{(|Y_m(k)|^2) \mid D_m(k), H_1\}$ in Equation 27 are expressed by Equation 29 below.

$$E\{(|Y_m(k)|^2) \mid D_m(k), H_0\} = 0 \quad \text{[Equation 29]}$$

$$E\{(|Y_m(k)|^2) \mid D_m(k), H_1\} =$$
$$\left(\frac{1}{1+\hat{\xi}_m(k)}\right) \sigma^2_{Y_m}(k) + \left(\frac{\hat{\xi}_m(k)}{1+\hat{\xi}_m(k)}\right)^2 (|D_m(k)|^2)$$

$\hat{\xi}(k)$ in Equation 28 and Equation 29 is expressed by Equation 30 below.

$$\hat{\xi}_m(k) = \frac{\sigma^2_{Y_m}(k)}{\sigma^2_{V_m+S_m}(k)} \quad \text{[Equation 30]}$$

The foregoing Equation 25 to Equation 30 correspond to operations S301 to S325.

The present invention has been described on the assumption that the statistical model is a normal distribution, but the present invention may also be applicable to a Laplacian distribution, a gamma distribution, and the like, besides the normal distribution.

Figure 5:
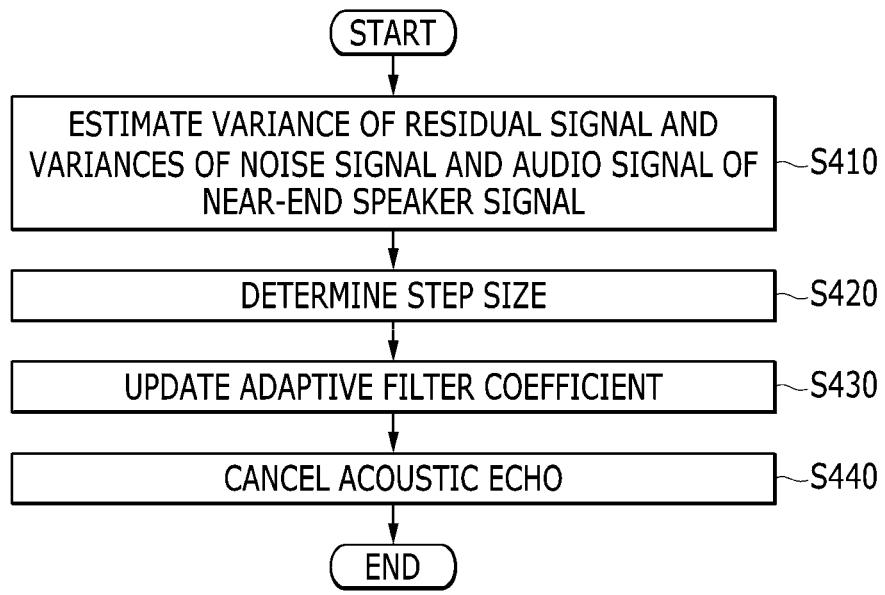
FIG. 5 is a view illustrating a process of canceling acoustic echo by an acoustic echo canceller according to an embodiment of the present invention.

FIG. 5 is a view illustrating a process of canceling acoustic echo by an acoustic echo canceller according to an embodiment of the present invention. The acoustic echo canceller cancels acoustic echo through the operations as described above with reference to FIGS. 1 through 4.

The acoustic echo canceller estimates a variance ($E\{|E_{pri,m}(k)|^2\}$) of a residual signal, a variance ($E\{|V_m(k)|^2\}$) of a noise signal of a near-end talker signal, and a variance of an audio signal of the near-end talker signal (S410). Operation S410 corresponds to the variance estimation operation as described above with reference to FIG. 4.

The acoustic echo canceller determines a step size (u(k)) (S420). Operation S420 corresponds to the step size determining operation as described above with reference to FIG. 3.

The acoustic echo canceller updates an adaptive filter coefficient ($\vec{W}(k)$) (S430). Operation S430 corresponds to the operation as described above with reference to FIG. 2.

The acoustic echo canceller cancels an actual acoustic echo signal ($\vec{Y}(k)$) from a microphone input signal ($\vec{D}(k)$) by using an estimated acoustic echo signal ($\vec{Y}(k)$) (S440). Operation S440 corresponds to the operation as described above with reference to FIGS. 1 and 2.

Figure 6:
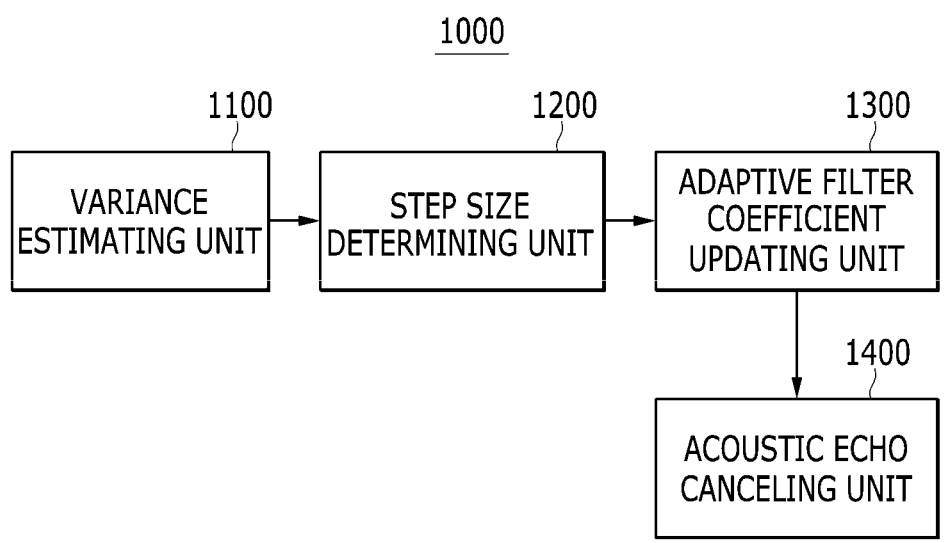
FIG. 6 is a block diagram of an acoustic echo canceller according to an embodiment of the present invention.

FIG. 6 is a block diagram of an acoustic echo canceller 1000 according to an embodiment of the present invention.

The acoustic echo canceller 1000 includes a variance estimating unit 1100, a step size determining unit 1200, an adaptive filter coefficient updating unit 1300, and an acoustic echo cancelling unit 1400.

The variance estimating unit 1100 estimates a variance ($E\{|E_{pri,m}(k)|^2\}$) of a residual signal, a variance ($E\{|S_m$ ($k)|^2\}$) of an audio signal of a near-end talker signal, and a variance ($E\{|V_m(k)|^2\}$) of a noise signal of the near-end talker signal. The variance estimating unit 1100 performs a variance estimating operation as described above with reference to FIG. 4.

The step size determining unit 1200 determines a step size ($u(k)$) by using the variance ($E\{|E_{pri,m}(k)|^2\}$) of the residual signal, the variance ($E\{|S_m(k)|^2\}$) of the audio signal of the near-end talker signal, and the variance ($E\{|V_m(k)|^2\}$) of the noise signal of the near-end talker signal. The step size determining unit 1200 performs the step size determining operation as described above with reference to FIG. 3.

The adaptive filter coefficient updating unit 1300 updates an adaptive filter coefficient ($\hat{\vec{W}}(k)$) by using the step size ($u(k)$). The adaptive filter coefficient updating unit 1300 performs the operation as described above with reference to FIG. 2.

The acoustic echo cancelling unit 1400 cancels an actual acoustic echo signal ($\vec{Y}(k)$) from a microphone input signal ($\vec{D}(k)$) by using the estimated acoustic echo signal ($\hat{\vec{Y}}(k)$). Here, the estimated acoustic echo signal ($\hat{\vec{Y}}((k))$) is a signal obtained by estimating the actual acoustic echo signal ($\vec{Y}(k)$) by using the adaptive filter coefficient ($\hat{\vec{W}}(k)$). The acoustic echo cancelling unit 1400 performs the operation as described above with reference to FIGS. 1 and 2.

According to embodiments of the present invention, a step size required for canceling acoustic echo is variably regulated by using a statistical model such that a post-residual signal is equal to a current near-end talker signal on the basis of an NLMS algorithm in a frequency domain. Accordingly, although an actual acoustic echo generation path (or RIR) is changed over time, an adaptive filter coefficient can be promptly adaptive to the actual acoustic echo generation path. Thus, according to an embodiment of the present invention, acoustic echo can be effectively canceled in an environment such as a mobile environment in which an actual acoustic echo generation path is frequently changed over time.

Also, according to an embodiment of the present invention, on the basis of a statistical model resistant to noise changing over time, variances of an audio signal and a noise signal of a near-end talker signal and a variance of a residual signal can be more accurately estimated. Further, according to an embodiment of the present invention, since variances of an audio signal and a noise signal of a near-end talker signal and a variance of a residual signal are estimated in each frequency bin, an optimal step size can be obtained.

In addition, according to an embodiment of the present invention, since a near-end talker signal is used in determining a step size, an additional effect of reducing a step size in a double-torque situation can be obtained. That is, according to an embodiment of the present invention, since a step size is reduced in a double-torque situation, an erroneous adaptive filter coefficient is not updated. Thus, since an erroneous adaptive filter coefficient is not updated, sound quality can be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for canceling an acoustic echo signal caused by a far-end talker signal, the apparatus comprising:
   a variance estimating unit configured to estimate a variance of a first audio signal of a near-end talker signal and a variance of a first noise signal of the near-end talker signal;
   a step size determining unit configured to determine a step size by using the variance of the first audio signal and the variance of the first noise signal;
   an adaptive filter coefficient updating unit configured to update an adaptive filter coefficient of an adaptive filter by using the step size; and
   an acoustic echo canceling unit configured to generate an estimated acoustic echo signal corresponding to the acoustic echo signal by using the adaptive filter coefficient, and cancel the acoustic echo signal from a microphone input signal by using the estimated acoustic echo signal,
   wherein the step size determining unit determines the step size such that a first residual signal is equal to the near-end talker signal, the first residual signal being a signal obtained by subtracting the estimated acoustic echo signal from the microphone input signal,
   wherein the estimated acoustic echo signal is a signal obtained by using the updated adaptive filter coefficient, and
   wherein the variance estimating unit estimates the variance of the first noise signal and the variance of the first audio signal by using a probability that a second audio signal will exist in the far-end talker signal.

2. The apparatus of claim 1, wherein the variance estimating unit uses a first probability that only a second noise signal will exist in the far-end talker signal in a frequency domain and a second probability that the second audio signal and the second noise signal will exist in the far-end talker signal in the frequency domain.

3. The apparatus of claim 2, wherein the variance estimating unit estimates a sum of the variance of the first noise signal and the variance of the first audio signal through smoothing.

4. The apparatus of claim 3, wherein the variance estimating unit calculates the sum by using a variance of the acoustic echo signal.

5. The apparatus of claim 2, wherein the second audio signal and the second noise signal are statistically independent from each other.

6. The apparatus of claim 1, wherein the step size determining unit determines the step size by using a sum of the variance of the first audio signal and the variance of the first noise signal.

7. The apparatus of claim 1, wherein the estimated acoustic echo signal is a first estimated acoustic echo signal, and wherein the step size determining unit determines the step size by using the following equation:

$$\mu = 2\left(1 - \sqrt{\frac{V_2}{V_1}}\right) \quad \text{[Equation]}$$

wherein $\mu$ is the step size, $V_1$ is a variance of a second residual signal obtained by subtracting a second estimated acoustic echo signal from the microphone input signal, the second estimated acoustic echo signal being obtained by using the adaptive filter coefficient before being updated, and $V_2$ is a sum of the variance of the first audio signal and the variance of the first noise signal.

8. The apparatus of claim 1, wherein the step size determining unit determines the step size in a frequency domain.

9. The apparatus of claim 1, wherein the adaptive filter coefficient updating unit uses a normalized least mean square (NLMS) algorithm in a frequency domain.

10. A method for canceling an acoustic echo signal caused by a far-end talker signal by an acoustic echo canceller, the method comprising:
estimating a variance of a first audio signal of a near-end talker signal and a variance of a first noise signal of the near-end talker signal;
determining a step size by using the variance of the first audio signal and the variance of the first noise signal;
updating an adaptive filter coefficient of an adaptive filter by using the step size;
generating an estimated acoustic echo signal corresponding to the acoustic echo signal by using the adaptive filter coefficient; and
canceling the acoustic echo signal from a microphone input signal by using the estimated acoustic echo signal,
wherein the step size is determined such that a first residual signal is equal to the near-end talker signal, and the first residual signal is a signal obtained by subtracting the estimated acoustic echo signal from the microphone input signal,
wherein the estimated acoustic echo signal is a signal obtained by using the updated adaptive filter coefficient, and
wherein the variance of the first noise signal and the variance of the first audio signal are estimated by using a probability that a second audio signal will exist in the far-end talker signal.

11. The method of claim 10, wherein the adaptive filter is a first filter, wherein when a path (a room impulse response (RIR)) in which the acoustic echo signal is generated is modeled as a second filter, the adaptive filter coefficient corresponds to a filter coefficient of the second filter.

12. The method of claim 10, wherein the variance of the first noise signal and the variance of the first audio signal are estimated by using a first probability that only a second noise signal will exist in the far-end talker signal in a frequency domain and a second probability that the second audio signal and the second noise signal will exist in the far-end talker signal in the frequency domain.

13. The method of claim 10, wherein the estimated acoustic echo signal is a first estimated acoustic echo signal, and wherein the step size is determined by using the following equation:

$$\mu = 2\left(1 - \sqrt{\frac{V_2}{V_1}}\right) \quad \text{[Equation]}$$

wherein $\mu$ is the step size, $V_1$ is a variance of a second residual signal obtained by subtracting a second estimated acoustic echo signal from the microphone input signal, the second estimated acoustic echo signal being obtained by using the adaptive filter coefficient before being updated, and $V_2$ is a sum of the variance of the first audio signal and the variance of the first noise signal.

14. The method of claim 10, wherein updating comprises using a normalized least mean square (NLMS) algorithm in a frequency domain.

15. An apparatus for canceling an acoustic echo signal caused by a far-end talker signal, the apparatus comprising:
a variance estimating unit configured to estimate a variance of a first audio signal of a near-end talker signal and a variance of a first noise signal of the near-end talker signal;
a step size determining unit configured to determine a step size by using the variance of the first audio signal and the variance of the first noise signal;
an adaptive filter coefficient updating unit configured to update an adaptive filter coefficient of an adaptive filter by using the step size; and
an acoustic echo canceling unit configured to generate an estimated acoustic echo signal corresponding to the acoustic echo signal by using the adaptive filter coefficient, and cancel the acoustic echo signal from a microphone input signal by using the estimated acoustic echo signal,
wherein the step size determining unit determines the step size such that a first residual signal is equal to the near-end talker signal, the first residual signal being a signal obtained by subtracting the estimated acoustic echo signal from the microphone input signal,
wherein the estimated acoustic echo signal is a signal obtained by using the updated adaptive filter coefficient, and
wherein the variance estimating unit estimates the variance of the first noise signal and the variance of the first audio signal by using a probability of presence of the acoustic echo signal.

* * * * *